US007292263B2

(12) United States Patent
Segelke et al.

(10) Patent No.: US 7,292,263 B2
(45) Date of Patent: Nov. 6, 2007

(54) ROBOTIC CCD MICROSCOPE FOR ENHANCED CRYSTAL RECOGNITION

(75) Inventors: Brent W. Segelke, San Ramon, CA (US); Dominique Toppani, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/360,879

(22) Filed: Feb. 22, 2006

(65) Prior Publication Data

US 2006/0207066 A1 Sep. 21, 2006

Related U.S. Application Data

(60) Provisional application No. 60/662,702, filed on Mar. 16, 2005.

(51) Int. Cl.
*H04N 7/18* (2006.01)

(52) U.S. Cl. .......................................... 348/79; 348/80

(58) Field of Classification Search .............. 348/70–80
See application file for complete search history.

(56) References Cited

U.S. PATENT DOCUMENTS

| 5,597,457 A | 1/1997 | Craig et al. |
| 2003/0150375 A1 | 8/2003 | Segelke et al. |
| 2005/0117144 A1* | 6/2005 | Greenway et al. ............ 356/30 |

FOREIGN PATENT DOCUMENTS

| WO | WO 01/09595 A2 | 2/2001 |
| WO | WO 2005/075717 A1 | 8/2005 |

* cited by examiner

*Primary Examiner*—Anand Rao
(74) *Attorney, Agent, or Firm*—Eddie E. Scott; John H. Lee (57) ABSTRACT

A robotic CCD microscope and procedures to automate crystal recognition. The robotic CCD microscope and procedures enables more accurate crystal recognition, leading to fewer false negative and fewer false positives, and enable detection of smaller crystals compared to other methods available today.

20 Claims, 4 Drawing Sheets

ROBOTIC CCD MICROSCOPE FOR ENHANCED CRYSTAL RECOGNITION

CROSS-REFERENCE TO RELATED APPLICATIONS

This application claims the benefit of U.S. Provisional Patent Application No. 60/662,702 filed Mar. 16, 2005 and titled "Robotic CCD Microscope for Enhanced Crystal Recognition." U.S. Provisional Patent Application No. 60/662,702 filed Mar. 16, 2005 and titled "Robotic CCD Microscope for Enhanced Crystal Recognition" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to charge-coupled devices (CCD) and more particularly to a robotic CCD microscope for enhanced crystal recognition.

2. State of Technology

U.S. Pat. No. 5,597,457 for a system and method for forming synthetic protein crystals to determine the conformational structure by crystallography to George D. Craig, issued Jan. 28, 1997 provides the following background information, "The conformational structure of proteins is a key to understanding their biological functions and to ultimately designing new drug therapies. The conformational structures of proteins are conventionally determined by x-ray diffraction from their crystals. Unfortunately, growing protein crystals of sufficient high quality is very difficult in most cases, and such difficulty is the main limiting factor in the scientific determination and identification of the structures of protein samples. Prior art methods for growing protein crystals from super-saturated solutions are tedious and time-consuming, and less than two percent of the over 100,000 different proteins have been grown as crystals suitable for x-ray diffraction studies."

International Patent No. WO0109595 A2 for a method and system for creating a crystallization results database to Lansing Stewart et al., published Feb. 8, 2001, provides the following background information, "Macromolecular x-ray crystallography is an essential aspect of modern drug discovery and molecular biology. Using x-ray crystallographic techniques, the three-dimensional structures of biological macromolecules, such as proteins, nucleic acids, and their various complexes, can be determined at practically atomic level resolution. The enormous value of three-dimensional information has led to a growing demand for innovative products in the area of protein crystallization, which is currently the major rate limiting step in x-ray structure determination. One of the first and most important steps of the x-ray crystal structure determination of a target macromolecule is to grow large, well diffracting crystals with the macromolecule. As techniques for collecting and analyzing x-ray diffraction data have become more rapid and automated, crystal growth has become a rate limiting step in the structure determination process."

United States Patent Application No. 2003/0150375 for automated macromolecular crystallization screening to Brent W. Segelke, Bernhard Rupp, and Heike, I. Krupka, published Aug. 14, 2003, provides the following state of technology information, a system of automated macromolecular crystallization screening of a sample. Initially, reagent components are selected from a set of reagents and a set of a multiplicity of reagent mixes are produced. A multiplicity of analysis plates are produced utilizing the reagent mixes wherein each analysis plate contains a set format of reagent mixes combined with the sample. The analysis plates are incubated to promote growth of crystals in the analysis plates. Images of the crystals are made. The images are analyzed with regard to suitability of the crystals for analysis by x-ray crystallography. A design of reagent mixes is produced based upon the expected suitability of the crystals for analysis by x-ray crystallography. If the crystals are not ideal, a second multiplicity of mixes of the reagent components is produced utilizing the design. The second multiplicity of reagent mixes are used for automated macromolecular crystallization screening the sample. The second round of automated macromolecular crystallization screening may produce crystals that are suitable for x-ray crystallography. If the second round of crystallization screening does not produce crystals suitable for x-ray crystallography a third reagent mix design is created and a third round of crystallization screening is implemented. If necessary additional reagent mix designs are created and analyzed.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a robotic CCD microscope and procedures to automate crystal recognition. The robotic CCD microscope and procedures enables more accurate crystal recognition, leading to fewer false negative and fewer false positives, and enable detection of smaller crystals compared to other methods available today. Accurate crystal recognition, particularly of small crystals, is a recognized problem in structural genomics, protein crystallography, and rational pharmaceutical design. Protein crystallography is projected to be a $1 billion industry in 2005. Accurate automated crystal recognition promises to substantially reduce the total man hours required to operate structural genomics processes and increase the throughput of these processes.

The present invention has applicability in Structural Genomics industries (e.g., Syrxx, SGX, Plexxikon, etc.). The invention also has applicability in rational drug discovery (e.g., Merk, Chiron, Roche, Johnson and Johnson, Sandos, etc.). The invention can also be extended to numerous other applications involving automated recognition of microscopic scale objects using light microscopy (e.g., Tissue dissection pathology, tissue typing, colony counting, etc.).

The present invention provides a robotic charge-coupled devices microscope for enhanced crystal recognition. In one embodiment the present invention comprises a charge-coupled devices camera, a zoom lens that has gears to drive zoom and focus, a zoom motor, a focus motor, a plate holder (or plate nest), a motorized xy stage, and a lighting system. In one embodiment the lighting system is made up of a cluster of high brightness white lumi-LED's. In one embodiment the lumi-LED's are arranged in circle, at the outer edge, and a small constellation of lights in the middle of the circle. In one embodiment the lumi-LED's in the middle of the circle are covered by a diffuser. In one embodiment the light is independently switchable and controlled through software. In one embodiment the circle of lights is off axis with a lens that enables the camera to take darkfield images, where the subject being imaged is not in a direct line between the light and the lens.

One embodiment of the present invention provides a robotic charge-coupled devices microscope for enhanced crystal recognition comprising a camera that produces light microscopy images, a lighting system that produces light, a digital conversion component of the camera that converts the light microscopy images into corresponding phase-based digital image data using Fourier transform; an edge detection component that detects edges from the image data by computing local maxima of a phase congruency-related function associated with each image; a segmentation component that divides the detected edges into discrete line segments; and a geometric analyzer component that evaluates the geometric relationships that the line segments have with each other to identify any crystal-like qualities, and determines whether crystals are present in each image based on the evaluation.

One embodiment of the present invention provides a method of for enhanced crystal recognition for detecting macromolecular crystals in images comprising detecting edges in the images by identifying local maxima of a phase congruency-related function associated with each image; segmenting the detected edges into discrete line segments; evaluating the geometric relationships that the line segments have with each other to identify any crystal-like qualities; and determining the presence of crystals in each image based on the evaluation.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Proteomics is the field of bioscience involving the characterization of the proteins encoded by the human genome, and enabled by the gene sequence data produced by the human genome project. Since the structure of a protein is key to understanding its function, one field of proteomics in particular has rapidly emerged concerning high throughput structure determination or structural genomics. In determining protein structure, the proteins are first crystallized, and crystals are analyzed by x-ray diffraction experiments from which x-ray diffraction patterns are obtained which in turn lead to three-dimensional picture of the atomic arrangement in the crystal. Advances in macromolecular crystallography techniques, computer speed, and the availability of high-energy synchrotron x-ray sources, make rapid structure determination possible given adequate quality protein crystals.

Crystal growth, however, is difficult because proteins are large, irregularly shaped molecules that do not readily come together in a repeating pattern, and the complete set of crystallization conditions is too large and impractical to screen comprehensively. Thus, previously uncrystallized proteins must be screened on a trial and error basis against a large array of conditions that have the potential to induce crystal formation. Automated methods using, for example, robotic liquid handling devices, robotic CCD-based microscope cameras, or light microscopes equipped with robotic stages and CCD cameras, have been developed and are commercially available to speed up the process of setting up and recording the results (automated image capture) of a large number of crystallization trials. However, a practical problem remains in that each experiment must still be visually inspected to determine successful crystal formation. In fact, the high throughput enabled by the automation in setup and image-capture has increased the visual inspection bottleneck, which is typically performed manually by human intervention.

One example of an automated crystal detection method developed to address the visual inspection bottleneck is disclosed in the article "Intelligent Decision Support for Protein Crystal Growth" (by Jurisica et al, IBM Systems Journal, Vol. 40, No. 2, 2001). In that article, and as shown in FIGS. 3-7 thereof, images of screening results are analyzed using a two-dimensional Fourier transform. In particular, FIG. 5C illustrates the Fourier frequency spectrum used in the analysis, and FIG. 5D illustrates an analysis of the spectrum derivatives and circular averages to provide features information of the image. From this feature extraction and analysis, the outcome of the experiment is classified as, clear drop, amorphous precipitate, phase separation, microcrystals, crystals, or unknown.

Despite such efforts, difficulties in automating (i.e. without human intervention) crystal detection remain due to such factors as poor image quality due to noise and low contrast, differences in crystal shapes, poorly formed crystals, etc. With respect to poor image quality, crystals may have less contrast relative to the background than other objects or particles. For example, the difference between the crystal and the background based on 256 gray levels is often 15 levels, whereas the difference for dirt is usually above 40 levels. Additionally, many different crystal shapes exist due to, for example, the existence of several large classes of crystal shape, the picture is a 2-D projection of a 3-D object, crystal imperfections with faulty edges, and large variations in crystal size, e.g., ranging from about 10 µm to greater than 300 µm. There are also many things on the picture that are not real crystals, such as dirt, precipitation, quasi-crystals, small drop due to condensation, and unidentified effects. Additionally, an automated crystal detection process must also achieve a high threshold of accuracy by being able to identify virtually all crystals with a low false-positive rate.

Thus in summary, there is a need for an automated crystal detection method and system for inspecting two-dimensional images and successfully detecting crystals therefrom. An automated solution for crystal detection, such as implemented by a software program, would be a great labor savor by possessing the capability of processing thousands of images a day and provide analysis substantially free from false positives.

The problem addressed by the present invention is automated crystal recognition. The approach taken by most previous efforts is to apply edge detection image analysis to images acquired using light microscopy followed by further analysis of varying sophistication. Crystal recognition is a complicated problem because crystals take on a wide range of shapes and sizes (ranging form sub micron size to millimeters in size) and often appear on a complex background. Well formed crystals have straight edges but the edges may not appear at high contrast with the background and the background may interrupt the straight edge. Objects sometimes appear in the foreground to confound crystal recognition as well. Crystal features also often appear at the limit of resolution of imaging systems used to acquire crystal pictures, in which case it is impossible to distinguish straight edges of a crystal.

Automated crystal recognition is an important problem because inspecting images for the existence of crystals is a tedious and time consuming job that quickly becomes the bottleneck in otherwise highly automated structural genomics processes. If it was possible to use automation for setting up crystallization experiments to full capacity, one would need only 1 full time employee to setup and track experiments but one would need 8 full time employees to inspect images for evidence of crystals. It is apparent that automated crystal recognition would save a tremendous amount of time and money and enable higher throughput for the entire process.

Figure 1:
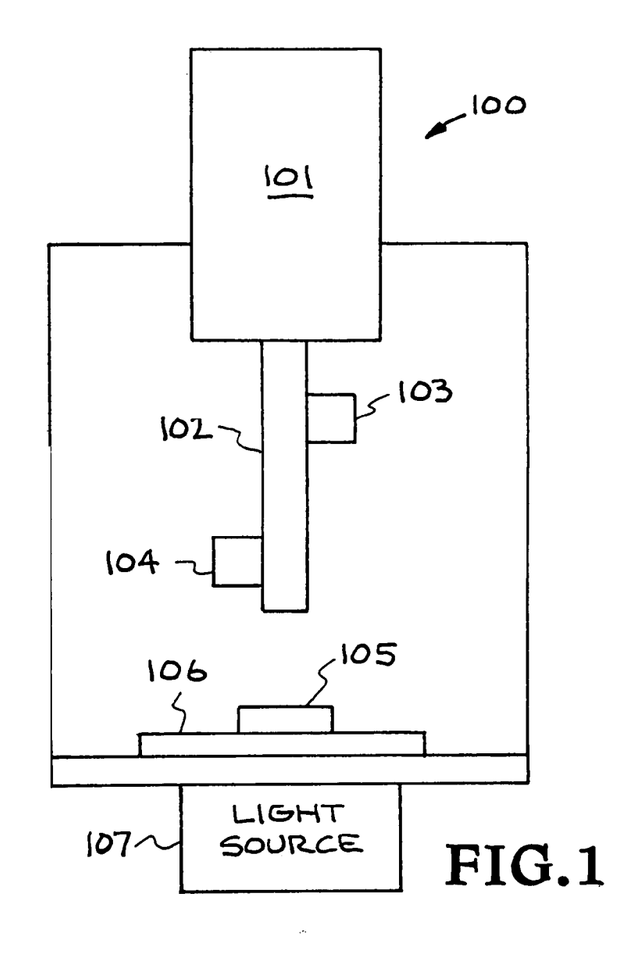
FIG. 1 illustrates a CCD microscope having a CCD camera, a zoom lens that has gears to drive zoom and focus, a zoom motor, a focus motor, a plate holder (or plate nest), a motorized xy stage, and a lighting system.

Referring now to the drawings and in particular to FIG. 1, one embodiment of a robotic charge-coupled devices microscope for enhanced crystal recognition constructed in accordance with the present invention is illustrated. The robotic charge-coupled devices microscope for enhanced crystal recognition is designated generally by the reference numeral 100. The CCD microscope 100 is made of a number of components found in many other CCD microscopes. The CCD microscope 100 includes a CCD camera 101, a zoom lens 102 that has gears to drive zoom and focus, a zoom motor 103, a focus motor 104, a plate holder (or plate nest) 105, a motorized xy stage 106, and a lighting system 107.

Figure 2:
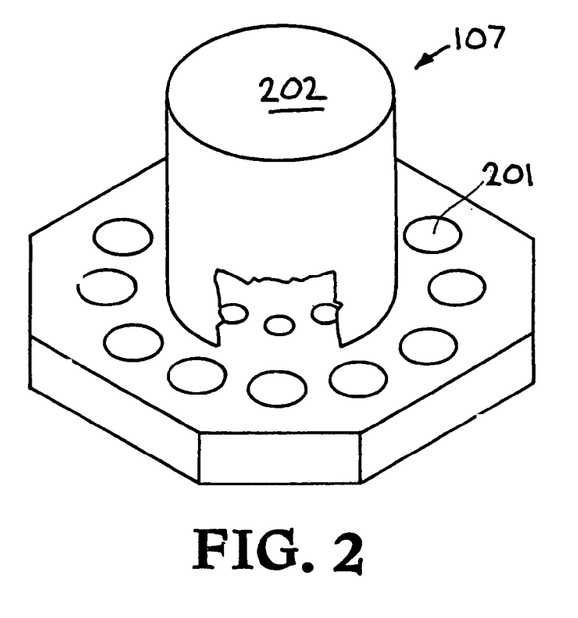
FIG. 2 illustrates a ring light for darkfield imaging.

Referring now to FIG. 2, the lighting system 107 is described in greater detail. The lighting system 107 is made up of a cluster of high brightness white lumi-LED's 201. The LED's 201 are arranged in circle, at the outer edge, and a small constellation of lights in the middle of the circle. The lights in the middle of the circle are covered by a diffuser 202. Each of the lights is independently switchable and controlled through software. The circle of light that is off axis with the lens enables the camera to take darkfield images, where the subject being imaged is not in a direct line between the light and the lens.

Darkfield microscopy, in combination with the other hardware and software features, enables a new technique to crystal recognition. Darkfield microscopy can be used to quickly asses if there are crystals present because crystal facets reflect more light than other, unfacetted objects. Because the light is off axis with the lens, much less scattered light is collected by the lens and the field is "dark." The faceted objects appear on the darkfield image with very high contrast. This is especially useful when looking for very small crystals (by small we mean small relative to the magnification). Crystals that are not at all apparent in the brightfield, because they are smaller than the resolution at low zoom, appear as small bright points in the dark field image and are easily identified as a potential crystal. The potential crystal can then be centered under the lens and the lens can be zoomed and refocused on the position of the putative crystal. Then a brightfield image is acquired and crystal recognition is applied.

For crystals to be observed in a darkfield image, the crystal facets have to be oriented in a particular angle relative to the incident light and the lens. If the experiments are illuminated from all angles to ensure any crystal will reflect light in to the lens, there is much more light scattered in to the lens, reducing the contrast. The present invention addresses that by having a ring of switchable lights. In practice, a series of images can be accumulated and put together in to a composite image. Each image is taken with incident light impinging on the object field from a narrow angle, thereby maintaining a high contrast.

One aspect of the present invention includes a method of detecting macromolecular crystals in light microscopy images comprising: detecting edges in said images by identifying local maxima of a phase congruency-related function associated with each image; segmenting the detected edges into discrete line segments; evaluating the geometric relationships that the line segments have with each other to identify any crystal-like qualities; and determining the presence of crystals in each image based on said evaluation.

Another aspect of the present invention includes a computerized system for detecting macromolecular crystals from light microscopy images comprising: a digital conversion component that converts said light microscopy images into corresponding phase-based digital image data using the Fourier transform; an edge detection component that detects edges from the image data by computing local maxima of a phase congruency-related function associated with each image; a segmentation component that divides the detected edges into discrete line segments; and a geometric analyzer component that evaluates the geometric relationships that the line segments have with each other to identify any crystal-like qualities, and determines whether crystals are present in each image based on said evaluation.

Another aspect of the present invention includes a computerized system for detecting macromolecular crystals from light microscopy images comprising: means for digitally converting said light microscopy images into corresponding phase-based digital image data using the Fourier transform; means for detecting edges from the image data by computing local maxima of a phase congruency-related function associated with each image; means for dividing the detected edges into discrete line segments; means for evaluating the geometric relationships that the line segments have with each other to identify any crystal-like qualities; and means for determining the presence of crystals in an image from said evaluation.

Another aspect of the present invention includes a computer program product comprising: a computer useable medium having a computer readable code embodied therein for causing the detection of macromolecular crystals in light microscopy images, said computer program product having: computer readable program code means for causing a computer to detect edges in said images by identifying local maxima of a phase congruency-related function associated with each image; computer readable program code means for causing said computer to segment the detected edges into discrete line segments; computer readable program code means for causing said computer to evaluate the geometric relationships that the line segments have with each other to identify any crystal-like qualities; and computer readable program code means for causing said computer to determine the presence of crystals in each image based on said evaluation.

Another aspect of the present invention includes an article of manufacture comprising: a computer useable medium having a computer readable code means embodied therein for causing the detection of macromolecular crystals in light microscopy images, said computer readable code means in said article of manufacture comprising: computer readable program code means for causing a computer to detect edges in said images by identifying local maxima of a phase congruency-related function associated with each image; computer readable program code means for causing said computer to segment the detected edges into discrete line segments; computer readable program code means for causing said computer to evaluate the geometric relationships that the line segments have with each other to identify any crystal-like qualities; and computer readable program code means for causing said computer to determine the presence of crystals in each image based on said evaluation.

And another aspect of the present invention includes a program storage device readable by a machine, tangibly embodying a program of instructions executable by the machine to perform method steps for detecting macromolecular crystals from light microscopy images, said method steps comprising: detecting edges in said images by identifying local maxima of a phase congruency-related function associated with each image; segmenting the detected edges into discrete line segments; evaluating the geometric relationships that the line segments have with each other to identify any crystal-like qualities; and determining the presence of crystals in each image based on said evaluation.

Figure 3:
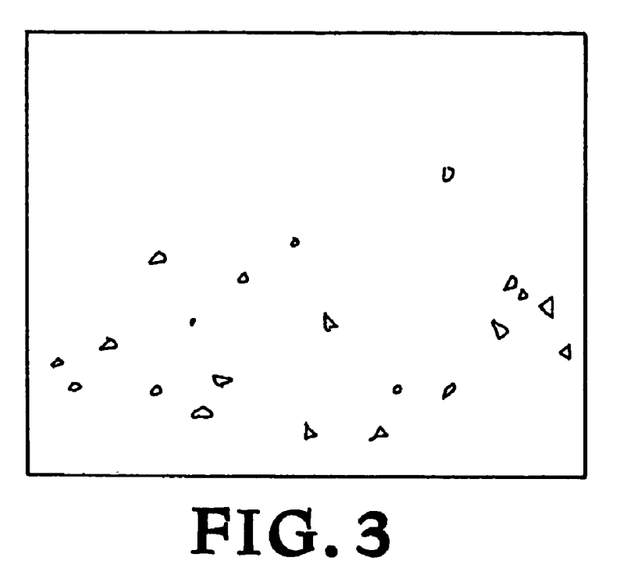
FIG. 3 is an illustration showing a darkfield image of small crystals.

Referring now to FIG. 3, an illustration shows a darkfield image of small crystals. Some of the crystals are large enough that crystal shape is obvious, but there are some crystals that are too small to resolve that show up in the darkfield image as points of light.

Figure 4:
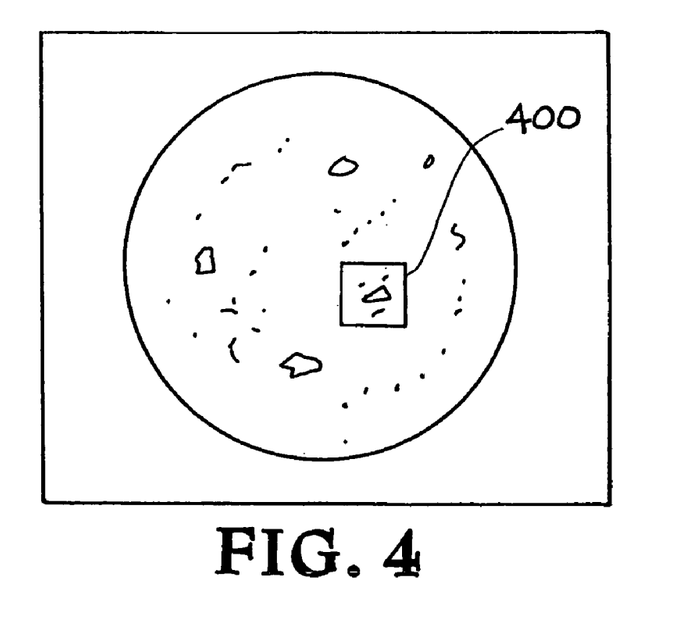
FIG. 4 is an illustration showing an original brightfiled image taken at low magnification.
Figure 5:
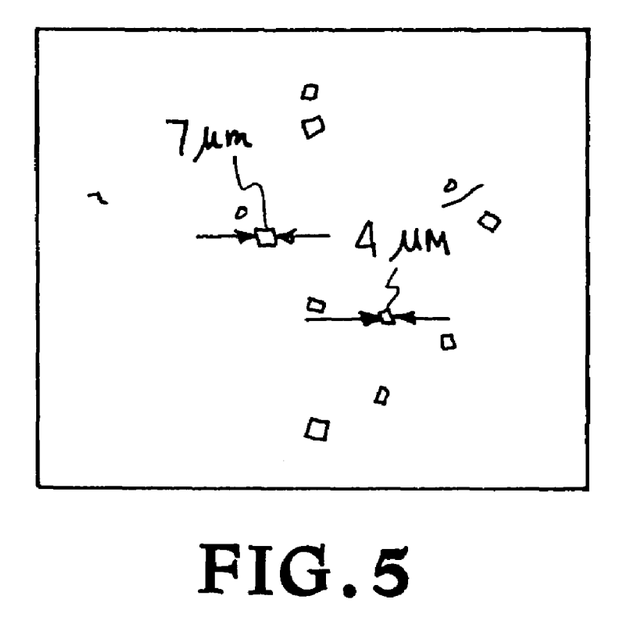
FIG. 5 is an illustration showing a light field image after zooming in on objects identified in a darkfield image.

Referring now to FIG. 4, an illustration shows original brightfiled image taken al low magnification to catch the whole experiment. The 400 square indicates the region that was zoomed in on to generate the next picture.

Referring now to FIG. 5, an illustration shows a Light field image after zooming in on objects identified in a darkfield image. Note, the crystals were not resolved in the previous picture but they are apparent at high magnification.

Figure 6:
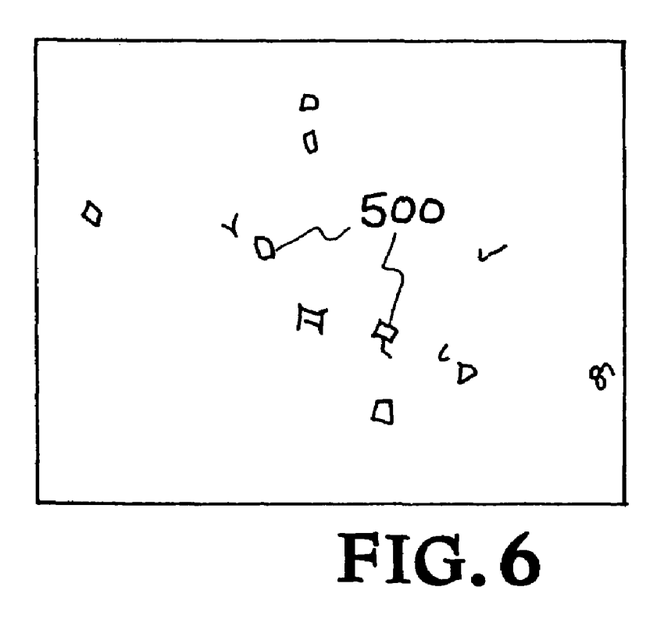
FIG. 6 is an illustration showing an output from crystal recognition software.

Referring now to FIG. 6, an illustration shows output from crystal recognition software. Note that the software accurately identified crystals 500 as small as 4 uM in size.

One embodiment of the present invention is identified by the term "CrysFind." CrysFind is a robust automated protein crystal recognition system that substitutes or replaces the human observer, thus removing the final roadblock to creating a fully automated crystallization laboratory. Nearly all processes in structural genomics have been effectively automated—except the critical step of identifying newly formed protein crystals. Now, the hope and the promise of structural genomics—not only to know all human genes but also to know the full three-dimensional structure of every gene product—are closer to attainment. The CrysFind system for automated protein crystal recognition offers the following features:

Full walk-away automation for the inspection of crystallization experiments.

Superior method for crystal detection.

Unique integration of hardware and software.

Integrated, iterative process for recognition of small crystals.

Higher resolution, contrast, and signal to noise.

Minimal false negative and false positive rates.

The CrysFind system is the only viable substitute for a human observer, and it surpasses both in speed and in accuracy what a human could do with a comparable microscope. Using CrysFind, a highly mechanized laboratory could produce tens of thousands of experiments a day with a single attendant. Its impact is far-reaching and includes the fields of structural genomics, structural biology, drug discovery, biotechnology, agriculture, proteomics, infectious disease, and basic biology. Data of this scale could enable fields of science not yet conceived.

Completion of the Human Genome Project is seen as an important first step toward a much deeper and more profound understanding of biology. We are now poised to take the massive sequence data set and drill down to find out which genes do what and how they do it. Structural genomics was identified shortly after the completion of the human genome project as the next big discovery-based research effort to follow the human genome project. Structural genomics was viewed as the potential successor to the human genome project because nearly all of the essential technologies for pursing structural biology on a massive scale seemed to be in hand or on the horizon. The hope and the promise of structural genomics as a follow-on to the human genome project was that we would not only know all human genes, but we would also know the full three-dimensional structure of every gene product. Having the structures of every gene product, we could begin to develop atomic-level models of what today seem like impossibly complicated biological processes.

Figure 7:
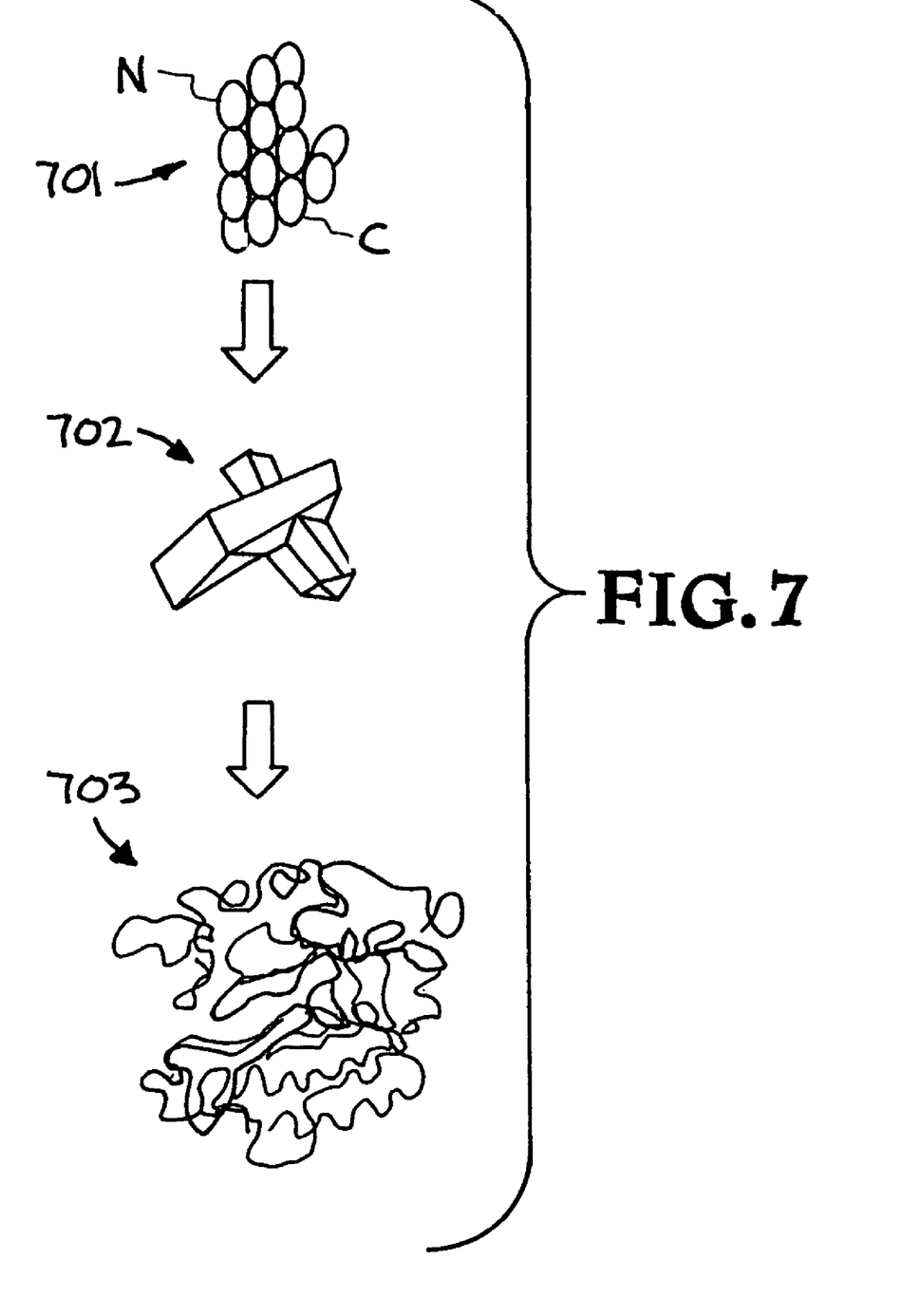
FIG. 7 is an illustration showing a structural genomics pipeline, from proteins to crystals and to the molecular structure.

Approximately five years into the structural genomics era, it became apparent that there were several obstacles to achieving the anticipated promise. Major barriers were protein crystallization (forming a crystalline substance from a protein solution) and the absence of a fully automated crystallization laboratory. The one key missing technology needed for a fully automated crystallization laboratory is a robust method for automated crystal recognition. In particular, a method for detecting very small crystals (<10 μm) was desperately needed. The CrysFind system technology for automated crystal recognition provides a key piece of the puzzle for full automation of crystallography. CrysFind complements the suite of technologies that made the vision of structural genomics possible and moves us a major step forward toward realizing the promise of structural genomics. Isolated and purified proteins samples are put into hundreds and perhaps thousands of crystallization screening trials. How to predict crystallization is unknown, so many conditions must be tried in the hopes of producing a crystal. Crystallization events are rare and can be easily overlooked, but each crystal is precious. If a crystal is discovered, it is used to elucidate the full three-dimensional structure of the protein at a resolution sufficient to see individual atoms. This last part of a structural genomics pipeline, from proteins to crystals and to the molecular structure, is described in FIG. 7. FIG. 7 illustrates a structural genomics pipeline 700 from protein 701 to crystal 702 to atomic structure 703.

Referring now to FIGS. 1-7, the present invention provides an automated method and system for detecting the presence of macromolecular crystals from light microscopy images, such as those obtained from crystallography experiments. Generally, the automated method utilizes the phase information of the pixels in each image in performing crystal detection. This provides much lower sensitivity to noise and other artifacts compared to amplitude or gradient based methods and leads to an edge map with many more features. And in particular, the edge map provided by the phase congruency method is used to identify specific geometric features in an image attributable to, and most likely indicative of, a crystalline structure, such as, for example, parallel edges, of similar length, facing each other, in relatively close proximity. Evaluation of detected geometries in this manner makes possible a low rate of false-positive detections and an effective resolution to the visual inspection bottleneck discussed in the Background caused by manual inspections. It is notable that the term "automated" suggests the absence of human intervention, although oversight of detection performance may still be present.

Implementation of the present invention is suitably achieved using, for example, software, computer code, ROM, integrated circuit, etc. (hereinafter "software") to execute and control the method steps and system functions. It is appreciated that the software may be written in any suitable programming language for operation on a suitable operating system or platform, not limited to any particular language or operating system or platform. For example, the software may be written as object oriented code having implementable subroutines that enable the user to call them in sequence to solve problems.

Two-dimensional images captured from crystallography experiments are first provided as input to begin the process. Edge features, if any, in each image are detected using phase congruency, and in particular, a phase congruency-based function. The detected edges are then segmented into discrete, straight line segments, followed by a geometric analysis and evaluation (hereinafter "evaluation") of the geometric relationships that the line segments have with each other to identify any crystal-like qualities. In particular, geometric relationships, such as parallel lines, facing each other, and similarity in length, as well as relative proximity to each other, are all crystal-like qualities in that they are characteristic of crystalline structure. And finally, a determination and decision is made based on the preceding geometric evaluation, as to whether crystals are present in a particular image. A decision with respect to any one image may be reported separately, or together in a list with other images determined to have detected crystals. The corresponding ones of the experiments may subsequently be collected for X-ray determination of atomic structure and protein identification.

Generally, the edge detection stage uses the phase of the Fourier transform of the image to find the images. Taking, for example, a 1-D step signal (representing the equivalent of an edge) and its cosine decomposition, the phases of all cosines are equal to zero only at the edge location, while everywhere else, the phases have different values. Since the phases of real signals are never actually equal, phase congruency or repartition is a method for measuring how much the phases of all the cosines are equal, with an edge corresponding to a local maximum of the phase congruency. It is preferred to compute the standard deviation of the cosine of the phases since computing the standard deviation of the phases at each point can give wrong results for the simple reason that $0=2\pi$. The phase congruency function for a 1-D continuous signal is therefore defined as:

$$PC(x) = \max_{\theta \in [0, 2\pi]} \frac{\int a_\omega \cos(\omega x + \Phi_\omega - \theta) d\omega}{\int a_\omega d\omega} \quad \text{(Equation 1)}$$

where $\alpha_\omega$ and $\Phi_\omega$ are respectively the amplitude and phase of the signal. Thus identifying the local maxima of the phase congruency function will also identify and thereby detect the edges. It is notable, however, that while this function provides the correct computational results, it is slow to compute directly.

In the alternative, the same result can be obtained using local energy, and Gabor filters which are similar in function to those present in the human brain for image perception and vision. The local energy of a 1-D signal is defined as:

$$LE(x) = \sqrt{I^2(x) + H^2(x)} \quad \text{(Equation 2)}$$

where $I(x)$ is the 1-D signal, and $H(x)$ is the Hilbert transform of I (i.e. ninety degree phase shift of $I(x)$ in the frequency domain). Given the cosine decomposition of $I(x)$ is:

$$\int \alpha_\omega \cos(\omega x + \Phi_\omega) d\omega \quad \text{(Equation 3)}$$

then $H(x)$ has the decomposition:

$$-\int \alpha_\omega \sin(\omega x + \Phi_\omega) d\omega \quad \text{(Equation 4)}$$

$I(x)$ is obtained by convolving the original signal by a filter to remove the DC component. And $H(x)$ is obtained by filtering the previous result by the Hilbert transform of the first filter. The human visual system has neuronal structures similar to a pair of odd and even symmetric filters in quadrature. If $M_e$ is the even filter and $M_o$ is the odd filter, one has:

$$M_e * f(x) \approx \int_{-\infty}^{+\infty} a_\omega \cos(\omega x + \Phi_\omega) d\omega \quad \text{(Equation 5)}$$

and $$M_o * f(x) \approx -\int_{-\infty}^{+\infty} a_\omega \sin(\omega x + \Phi_\omega) d\omega \quad \text{(Equation 6)}$$

The even symmetric filter is chosen so that it covers as much of the frequency spectrum as possible, and at the same time removing the D.C. term. Since it is nearly impossible to have such a perfect filter, the approximate equal sign is used in Equations (5) and (6) above. The odd filter is the $\pi/2$ phase shift even one. In the real implementation, the filters are band-pass filters and different local energies are computed for different scale. This allows for a multi-scale analysis of the image to be performed, with the possibility to look for features of different size, and for example getting rid of noise or features very small that cannot be crystal.

The phase congruency function and the local energy function are related by:

$$\begin{aligned} LE(x) &= \left\| \left( \int_{-\infty}^{+\infty} a_\omega \cos(\omega x + \Phi_\omega) d\omega, -\int_{-\infty}^{+\infty} a_\omega \sin(\omega x + \Phi_\omega) d\omega \right) \right\| \\ &= \max_{\theta \in [0, 2\pi]} \left( \int_{-\infty}^{+\infty} a_\omega \cos(\omega x + \Phi_\omega) d\omega, -\int_{-\infty}^{+\infty} a_\omega \sin(\omega x + \Phi_\omega) d\omega \right) \cdot (\cos\theta, -\sin\theta) \\ &= \max_{\theta \in [0, 2\pi]} \int_{-\infty}^{+\infty} a_\omega \begin{pmatrix} \cos(\omega x + \Phi_\omega)\cos\theta + \\ \sin(\omega x + \Phi_\omega)\sin\theta \end{pmatrix} dw \\ &= \max_{\theta \in [0, 2\pi]} \int_{-\infty}^{+\infty} a_\omega (\cos(\omega x + \Phi_\omega - \theta)) dw \end{aligned} \quad \text{(Equation 7)}$$

$$LE(x) = \int a_\omega d\omega \cdot PC(x) \quad \text{(Equation 8)}$$

As used herein, the term "phase congruency-based function" is used to describe both the phase congruency function PC(x) as well as the local energy function LE(x). A local maximum in the local energy corresponds to a local maximum in the phase congruency, and to an edge. Therefore, in order to search for local maxima in the phase congruency function, one equivalently searches for local maxima in the local energy function. These local maxima will occur at step edges of both parity (up or down), lines and bar edges, and other types of features such as the illusion patterns mentioned before. While the previous calculations for both PC(x) and I(x) were for 1-D signals, it is appreciated that a 2-D signal can also be decomposed in a series of 1-D signals by traversing and accounting for many orientations. The local energy of a point will be the maximum local energy among all the orientations.

An exemplary edge detection step using a phase congruency-based function (e.g., local energy function) associated with an image will be described. Multiple orientations are considered. For each orientation and each scale, a Gabor filter is used to filter the image. The objective of this filtering step is to convert the spatial information in another space representation where the noise will be present everywhere, and the information will be more localized, so that the noise and information can be separated, and converted back to the normal space. Gabor filters are used since they closely approximate the human visual system, as previously discussed. They are the combination of the two real filters in quadrature, and are the result of a sine wave modulated by a Gaussian function as in:

$$g(x, y) = \frac{1}{2\pi\sigma^2} \exp\left\{-\frac{x'^2 + y'^2}{2\sigma^2}\right\} \cos(2\pi\omega x') \quad \text{(Equation 9)}$$

where $(x', y') = (x\cos\theta + y\sin\theta, -x\sin\theta + y\cos\theta)$. In other words, $(x', y')$ is the $\theta$ rotation of $(x, y)$. And local energy is calculated from the information at the different scales.

Noise variance and mean of the local energy is estimated, and a noise threshold is applied on the local energy. Considering first the noise threshold, the filter response will be decreased by the noise threshold to remove the components considered as noise. However, finding the right threshold can be difficult. The expected response of the Gabor filters to a pure noise signal must first be examined. If the noise is supposed to be Gaussian, the complex response will have a 2-D Gaussian distribution. And the magnitude will be a Rayleigh distribution as:

$$R(x) = \frac{x}{\sigma_g^2} e^{\frac{-x^2}{2\sigma_g^2}} \quad \text{(Equation 10)}$$

where $\sigma_g^2$ is the variance of the 2-D Gaussian distribution. The mean and variance of the Rayleigh distribution are given by:

$$\mu_r = \sigma_g \sqrt{\frac{\pi}{2}} \quad \text{(Equation 11)}$$

and $$\sigma_r^2 = \frac{4 - \pi}{2} \sigma_g^2$$

The noise threshold can be set to some number of standard deviation beyond the mean of the distribution as in $T = \mu + k\sigma_r$.

Additionally, the noise amplitude distribution must be determined. The median value is considered as a statistically robust estimation of the mean. The smallest scale of the Gabor filter is used because the noise should be the most present at this scale. The median of a Rayleigh distribution is the value x such that $$\int_0^x \frac{x}{\sigma_g^2} e^{\frac{-x^2}{2\sigma_r^2}} = \frac{1}{2} \quad \text{(Equation 12)}$$

that leads to $$\text{median} = \sigma_g \sqrt{-2\ln(1/2)} \quad \text{(Equation 13)}$$

The mean of the Rayleigh distribution being $\sigma_g\sqrt{\pi/2}$, one gets the estimated mean of the amplitude response at smallest scale by a simple proportionality $$\text{mean} = \frac{\sigma_g \sqrt{\pi/2}}{\sigma_g \sqrt{-2\ln(1/2)}} \cdot \text{median} \qquad \text{(Equation 14)}$$

Assuming that noise has a uniform repartition among frequency, the noise threshold at larger scales can be deduced by the threshold at the smallest scale since the noise amplitude response will be proportional to the bandwidth, itself related to the scale. It is notable that while the noise reduction process is described as executed in the edge detection stage, it is appreciated that noise reduction may be performed as a pre-processing step prior to edge detection.

Local energy from each orientation is summed together, and the magnitude from each orientation is summed together. The summations provide the values necessary to solve Equation (8) above. In particular, by dividing local energy by the magnitude, the phase congruency function is obtained. Furthermore, local maxima of the phase-congruency-based function (either PC(x) or LE(x)) is identified to detect corresponding edges. In this manner an edge map may be constructed, for example, with local maxima occurring at step edges of both parity (up or down), lines and bar edges, and other types of features such as the illusion patterns.

Additionally, the geometry analysis and evaluation stage may also be performed using additional criteria, including: (1) minimum gradient along edges, and (2) central symmetry. With respect to the first additional criteria, and for a given edge, the gradient (i.e. first derivative of the original picture) for each pixel overlapping this edge is summed together. If this sum is above a specific gradient, the edge is then considered relevant. With respect to the second criteria, symmetry centers are found using the phase information. An important aspect of symmetry is the periodicity that it implies in the structure of the object. To determine the centers of symmetry, the picture is filtered with the same pair of even and odd symmetric Gabor filters as for the edge detection technique. At a point of symmetry, the absolute value of the even filter will be large, and the absolute value of the odd one will be small. Taking the difference of the absolute value of the even-symmetric filter and the odd one give a quantification of the degree of symmetry in an object.

The Promise of Structural Genomics—Structural genomics holds the promise to provide a profound new understanding of biology. Structural genomics aims to produce protein structures on a massive scale—a scale akin to that of the human genome project. The advent of structural genomics marks a new era for structural biology in drug discovery. The success of the human genome project and significant advances in new technologies for structural biology have made possible a new grander vision for what is possible using structural biology as a means to interrogate nature's processes.

Structural genomics has already spawned new industries. Companies have sprung up to sell new technologies or consumables that aid structural genomics efforts, and companies have also been launched with the mission to use structural genomics as a powerful new tool to speed the time for developing new medicines to reach the marketplace.

The Automated Protein Crystal Recognition System—The CrysFind system, developed for automated crystal recognition, is fairly robust for detecting larger crystals (<50 μM). CrysFind reduces both the false negative rate and false positive rate to <3% compared to a trained human observer. However, criterion for a robust crystal detection procedure that could be fully substituted for a human observer is <5% false negatives on crystals smaller than 10 μM since this is better than the threshold achievable by a trained human observed using current systems.

The CrysFind system imaging system is capable of acquiring images at a very high magnification, which enables detection of small crystals (<5 μM), but a whole experiment cannot be interrogated at maximum zoom because image acquisition and image analysis becomes rate limiting. What was needed was a procedure that quickly identified prospective crystals at low magnification and confirmed the presence of crystals at high zoom, effectively zeroing in on just the important area of the image field. Small potential crystals are rapidly identified at low zoom using dark-field imaging (FIG. 3). Next, the bright features are centered, and the size of the image is enhanced by the automated zoom option (FIG. 5). Then, a high-zoom bright-field image is captured. Lastly, CrysFind autodetection is applied (FIG. 6) to detect if crystals are present.

FIG. 3 shows Dark-field image of small crystals. Some of the crystals are large enough that the crystal shape is obvious, but there are some crystals that are so small they cannot be resolved. The crystals that are smaller than the resolution at the given zoom show up in the dark-field image as points of light.

FIGS. 5 and 6 are Photographs showing (a) a high-zoom image of small crystals taken with CrysFind's robotic CCD imaging system and (b) the results of automated crystal recognition with CrysFind. Any line in the output indicates that CrysFind has found a crystal.

The combination of switchable lighting for dark-field and bright-field imaging, auto-focus, auto-zoom, and software for crystal recognition facilitates this procedure for robust automated crystal recognition of small crystals. All of these features are integrated into the CrysFind system. This is the only available system that is a viable substitute for a human observer and, therefore, the only product of its kind helping to fulfill the grander vision of structural genomics. The CrysFind system frees valuable human resources, but more importantly, identifies precious leads that are missed with other methods. Each new lead is the potential lynch pin to the development of a new therapy, a new antibacterial, or the basis for a new understanding of biology.

The CrysFind system has a number of specifications or capabilities that are directly comparable and superior to capabilities offered by competitive products, but the CrysFind system delivers combined features that enable a procedure for automated protein crystal recognition that no other product offers. The CrysFind system is the only viable substitute for a human observer, surpassing both in speed and in accuracy what a human could do with a comparable microscope. The CrysFind system for automated protein crystal recognition offers the following:

Full walk-away automation for the inspection of crystallization experiments.
A complement to structural genomics technologies.
Greater time savings.
Increased screening capacity.
Faster delivery time of new therapies to the consumer.
These benefits are enabled by the following capabilities:
Superior method for crystal detection.
Unique integration of hardware and software.
Integrated iterative process for recognition of small crystals.

CrysFind has several technical specifications that surpass capabilities of one or all other systems available as well. The CrysFind system automated protein crystal recognition system delivers the following features:

Higher resolution.

Higher signal to noise.

Higher contrast.

Improved false negative and false positive rates.

Full walk-away automation from image capture through crystal detection.

Structural Genomics—The CrysFind system product will be principally applied to structural genomics. For the promise of structural genomics to be achieved—not only to know all human genes but also to know the full three-dimensional structure of every gene product—automation must facilitate crystallography on a massive scale. The CrysFind system automated protein crystal recognition system does exactly that because it is the only effective substitute for a human observer. With this product, it is now possible that a highly mechanized laboratory could produce and attend to tens of thousands of experiments a day with a single attendant. As with the human genome project, producing data on this scale will enable fields of science yet to be conceived.

Structural Biology—The CrysFind system also has great value in a more traditional structural biology laboratory. While structural genomics settings will put the highest demands on technologies for accuracy and throughput, hundreds of more traditional structural biology laboratories would also benefit from the CrysFind system. The CrysFind system surpasses the capabilities of a human observer in speed and in accuracy and could help individual researchers do a more effective job.

Drug Discovery—Robust, effective, and high-throughput crystal recognition forms the basis for all applications of structural genomics. Structural genomics in turn brings us in to a new era of drug discovery by making use of the structural information of proteins for the diagnosis, prevention, and treatment of disease. We are entering a period of biology research in which it will be commonplace to have an atomic structure for many, if not most, of the proteins, or molecular machines, encoded in the genome. Over the last 25 years, atomic structures have been used more and more extensively as the basis for discovering new medicines. HIV protease inhibitors, the most effective treatment today for HIV AIDS, were derived from the knowledge of the HIV protease protein atomic structure. As structural genomics provides a quicker way to obtain new structure information and as the database of known structures grows, structure-based drug design will become increasingly useful. We can expect a veritable bonanza of new medicines in the coming decades.

Biotechnology—There is an immediate application in biotechnology. Several new companies have formed, with various business models, using high-throughput crystallography as their platform. The first and most prevalent business model for startup using high-throughput crystallography is a service model whereby a company with the critical infrastructure convinces big pharma companies to outsource crystallography. High-throughput crystallography companies that become established pursue strategic alliances where they develop critical expertise and knowledge of particular disease pathways and perhaps even develop lead drug candidates of interest to pharma companies. There is even a larger number companies, either newly founded to sell patented technologies or entering high-throughput crystallography as a new venture, selling technologies and consumables to other companies with high-throughput crystallography platforms. Finally, there is a major business opportunity to use the power of structure-aided design to build nanomachines (structures 100 nanometers in size or smaller) and industrial catalysts.

Agriculture—There is a major business opportunity to use the power of structure-aided design to better understand plant biology and to develop new organic-based pesticides that are not harmful to plants or humans.

Proteomics—assigning function to genes with unknown function —High-throughput crystallography can be applied to gene products, proteins of unknown function in a wholesale manner. This application is only possible due to the tremendous capacity provided by automated processes.

Infectious disease—High-throughput crystallography can be applied to the study of infectious bacteria, which will lead to specific antibacterials or general antibiotics.

Basic Biology—A long-standing recognized problem in bioscience is the so-called "protein folding problem." The challenge is to understand how a gene sequence encodes a particular protein structure and ultimately the function of the protein. Many hundreds of millions of dollars have been spent trying to approach this problem theoretically and by computation over the last two decades. In fact, the budgets for building some of the world's largest computers are justified, to some degree at least, on the basis that these computers will address the protein folding problem.

With a platform for finally achieving high-throughput crystallography, the protein folding problem may be solved experimentally. If so, biologists will worry less about obtaining protein structure information and more about understanding biology and will develop more sophisticated models of structure and function at the atomic level.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A robotic charge-coupled devices microscope for enhanced crystal recognition, comprising:

a charge-coupled devices camera, a zoom lens that provides zoom and focus for said charge-coupled devices camera, said zoom lens having a lens axis, a plate holder, a motorized stage, and a lighting system having an off axis portion that is off axis with said lens axis; wherein said lighting system is made up of a cluster of high brightness lights arranged in circle, a small constellation of lights, and a diffuser; wherein said off axis portion of said lighting system comprises said cluster of high brightness lights arranged in a circle, wherein said small constellation of lights are in the middle of said circle, and wherein said small constellation of lights in the middle of said circle are covered by said diffuser.

2. The robotic charge-coupled devices microscope of claim 1 wherein said cluster of high brightness lights is made up of a cluster of high brightness white lumi-LED's.

3. The robotic charge-coupled devices microscope of claim 2 wherein said high brightness white lumi-LED's are arranged at the outer edge of said circle and said small constellation of lights are in the middle of said circle.

4. The robotic charge-coupled devices microscope of claim 3 wherein said high brightness white lumi-LED's are independently switchable.

5. The robotic charge-coupled devices microscope of claim 3 wherein said high brightness white lumi-LED's comprise individual lights and each of said individual lights is independently switchable and controlled through software.

6. The robotic charge-coupled devices microscope of claim 1 wherein said robotic charge-coupled devices microscope is adapted to image a subject and wherein said cluster of high brightness lights arranged in a circle is off axis with said lens axis and wherein said off axis portion of said lighting system enables said camera to take darkfield images, where the subject being imaged is not in a direct line between said cluster of high brightness lights and the lens.

7. The robotic charge-coupled devices microscope of claim 1 including darkfield microscopy, in combination with the other hardware and software features, enables a new technique to crystal recognition.

8. The robotic charge-coupled devices microscope of claim 1 wherein said zoom lens includes gears to drive zoom.

9. The robotic charge-coupled devices microscope of claim 1 wherein said zoom lens includes gears to drive focus.

10. The robotic charge-coupled devices microscope of claim 1 wherein said zoom lens includes gears to drive zoom and focus.

11. The robotic charge-coupled devices microscope of claim 1 wherein said zoom lens includes a zoom motor.

12. The robotic charge-coupled devices microscope of claim 1 wherein said zoom lens includes a focus motor.

13. The robotic charge-coupled devices microscope of claim 1 wherein said zoom lens includes a zoom motor and a focus motor.

14. The robotic charge-coupled devices microscope of claim 1 wherein said plate holder is a plate nest.

15. A robotic charge-coupled devices microscope for enhanced crystal recognition, comprising:
   a camera that produces light microscopy images, said camera having a lens with a lens axis,
   a lighting system that produces light, said lighting system having an off axis portion that is off axis with said lens axis; wherein said lighting system is made up of a cluster of high brightness lights arranged in circle, a small constellation of lights, and a diffuser; wherein said off axis portion of said lighting system comprises said cluster of high brightness lights arranged in a circle, wherein said small constellation of lights are in the middle of said circle, and wherein said small constellation of lights in the middle of said circle are covered by said diffuser,
   a digital conversion component of said camera that converts said light microscopy images into corresponding phase-based digital image data using Fourier transform;
   an edge detection component that detects edges from the image data by computing local maxima of a phase congruency-related function associated with each image;
   a segmentation component that divides the detected edges into discrete line segments; and
   a geometric analyzer component that evaluates the geometric relationships that the line segments have with each other to identify any crystal-like qualities, and determines whether crystals are present in each image based on said evaluation.

16. A method of for enhanced crystal recognition for detecting macromolecular crystals in images comprising the steps of:
   darkfield imaging the macromolecular crystals to produce a darkfield image having features,
   zooming on said features in said darkfield image to produce a zoomed image,
   bright field imaging said zoomed image,
   detecting edges in said zoomed image by identifying local maxima of a phase congruency-related function associated with said zoomed image;
   segmenting said detected edges into discrete line segments;
   evaluating the geometric relationships that said line segments have with each other to identify any crystal-like qualities; and
   determining the presence of crystals in said zoomed image based on said evaluation.

17. A method of for enhanced crystal recognition for detecting macromolecular crystals, comprising the steps of:
   darkfield imaging the macromolecular crystals to produce a darkfield image with features,
   zooming on said features in said darkfield image to produce a zoomed image,
   bright field imaging said zoomed image, and
   providing crystal recognition in said zoomed image for detecting macromolecular crystals using a computer program.

18. The method of for enhanced crystal recognition of claim 17 wherein said step of providing crystal recognition in said zoomed image for detecting macromolecular crystals using a computer program uses the CrysFind computer program.

19. The method of for enhanced crystal recognition of claim 17 wherein said step of providing crystal recognition for detecting macromolecular crystals with a computer program uses a robust automated protein crystal recognition computer program.

20. The method of for enhanced crystal recognition of claim 17 wherein said step of providing crystal recognition in said zoomed image for detecting macromolecular crystals includes the steps of
   detecting edges in said zoomed image by identifying local maxima of a phase congruency-related function associated with said zoomed image;
   segmenting said detected edges into discrete line segments;
   evaluating the geometric relationships that said line segments have with each other to identify any crystal-like qualities; and
   determining the presence of crystals in said zoomed image based on said evaluation.

* * * * *